Jan. 3, 1956  
C. E. PHILLIPS  
2,729,358  
BAKE PANS PROVIDED WITH IMPROVED MEANS FOR
ATTACHING THE SAME TO THE STRAPPING  
Filed May 15, 1952
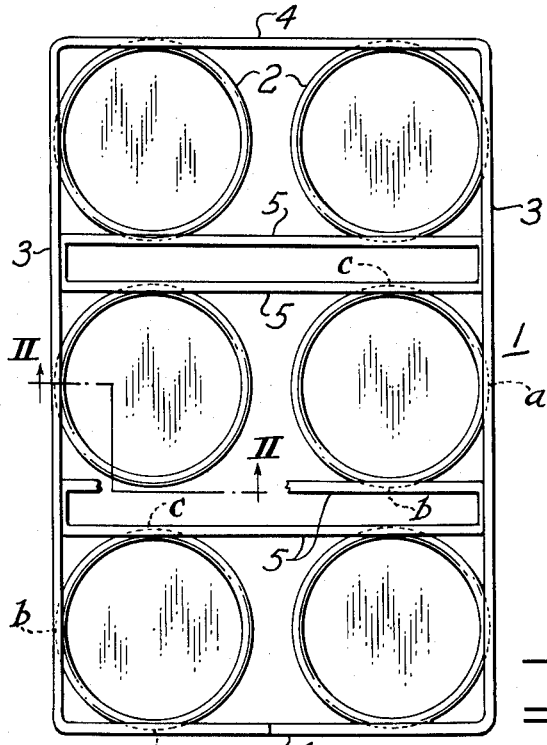
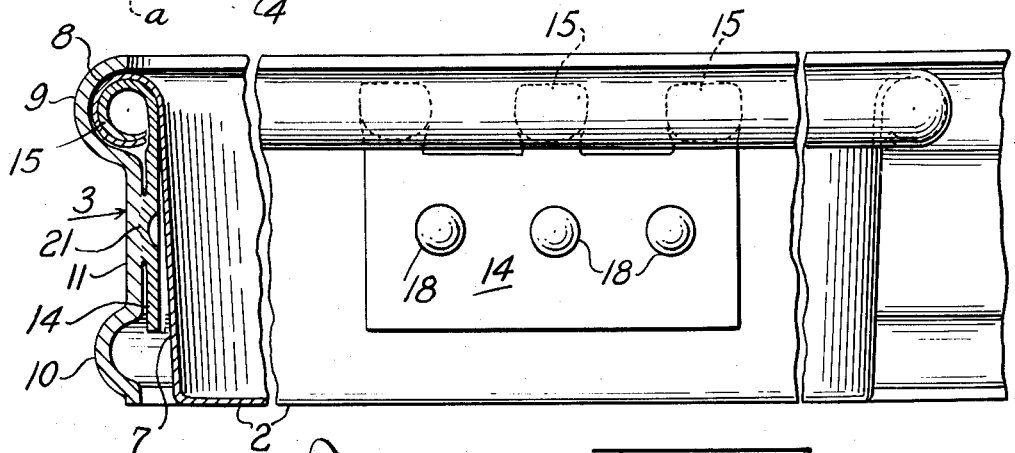
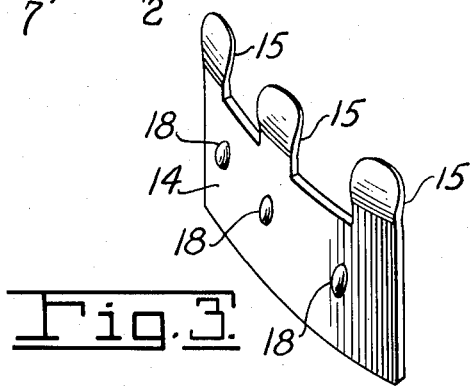
INVENTOR.
CHARLES E. PHILLIPS
BY
Zugelter & Zugelter
Attys.

United States Patent Office 2,729,358
Patented Jan. 3, 1956

2,729,358
BAKE PANS PROVIDED WITH IMPROVED MEANS FOR ATTACHING THE SAME TO THE STRAPPING

Charles E. Phillips, Cincinnati, Ohio, assignor to The Lockwood Manufacturing Co., Cincinnati, Ohio, a corporation of Ohio Application May 15, 1952, Serial No. 287,999

5 Claims. (Cl. 220—23.2)

This invention relates to bake pans and more particularly to bake pan units such as used by commercial bakeries and to an improved arrangement of securing the individual pans to the strapping or the bands thereof.

In commercial bakeries, bread and cakes and other baker products are baked in bake pan units that comprise a plurality of individual pans strapped together as a unit by band iron.

An object of this invention is to provide an improved means of securing bake pans of the type set forth above to the strapping.

Another object of the invention is to provide an improved means of yieldingly securing the pans to the strapping.

A further object of the invention is to provide a securing means of the type set forth above that includes a metal plate designed to be firmly attached cantilever fashion to the rim of a pan the body of the plate being firmly secured to the strapping as by welding, thereby relieving the sides or end walls of the pans of mechanical strain that might result from unequal expansion or contraction of the strapping of the pans if the pan walls were secured to the strapping.

Other objects and advantages of the invention will be apparent to those skilled in this art from the following description taken in conjunction with the accompanying drawing in which:

Figure 1 is a top plan view of a bake pan unit provided with side, end, and cross strapping arranged and constructed in accordance with an embodiment of the invention;

Fig. 2 is a partial view partly in section taken on line II—II of Fig. 1;

Fig. 3 is a view in perspective of a plate whereby the individual pans of Fig. 1 are resiliently secured to the strapping;

Fig. 4 is an enlarged fragmentary view of a piece of strapping formed or shaped to accommodate the plate shown in Fig. 3; and Fig. 5 is a fragmentary view of a section of a modified form of pan construction to which the plate of Fig. 3 is applicable for securing the pan to the strapping.

In Fig. 1 of the drawing, a bake pan set 1 is shown that includes a plurality of pans 2 which are secured together as a unit by strapping 3 and 4 at the sides and ends together as a unit by strapping 3 and 4 at the sides and ends respectively of the unit, and cross strapping 5. The arrangement of the pans in the strapping may take various forms depending upon the type of bake pan unit required by a given bakery. The form illustrated by Fig. 1 is merely a typical arrangement comprising three rows of pans containing two pans per row.

The shape of the strapping and of pans 2 in section is illustrated by the sectional view in Fig. 2. Each pan 2 is circular in form having a tapered side wall 7 and a curled or rolled hollow lip 8. The strapping has a trough-like bead 9 at the top edge thereof and a similar but smaller bead 10 at the bottom edge. The upper and lower trough-like sections are connected by a web 11. The depth of the trough-like bead or lip 9 is such as to accommodate the rolled lip 8 of the individual pans.

The pans are secured to the strapping of the unit at the points where the pans are substantially tangent thereto. Thus, as illustrated in Fig. 1, each pan is secured to the strapping at three points a, b, and c. The pans are secured at these points to the strapping by means of a plate 14 shown in Figs. 2 and 3. The upper edge of the plate is provided with a plurality of spaced fingers 15. As shown in Fig. 3, the fingers 15 are integral with the upper edge of the plate. The thickness of the fingers at the upper edge of the plate is approximately equal to the thickness of the plate. From that edge to the free ends of the fingers, the thickness decreases as shown. The fingers may be thinned as shown by a coining operation. Since the pans illustrated in Figs. 1 and 2 are circular, the plate 14 is shaped to conform to the contour of the side walls of the pans.

A plate 14 is secured to the pans at each of the points where the pans are to be secured to the strapping. To secure a plate 14 at a given point, the plate is so positioned that the free ends of fingers 15 enter the space between the side wall 7 and the adjacent edge of the rolled lip 8. In that position, they are either driven or pressed into the hollow of the rolled lip 8, thereby causing the fingers to curl within the rolled lip as shown in Fig. 2. As these fingers curl, they have a snug friction fit with the inside surface of the rolled lip. Plate 14 is thereby secured cantilever fashion to the lip of the pan.

Plate 14 may be secured to the strapping in any desired manner preferably by welding. As shown, plate 14 is formed with a plurality of lugs 18 that project towards the inside face of web 11 of the strapping. Since the plate 14 is arcuate in the case of round pans, the web 11 is provided with an arcuate section 20 as shown in Fig. 4 so that the inside surface of web 11 at the section 20 will engage the lugs 18. The arcuate section 20 of web 11 and the lugs 18 are joined by resistance welding, the lugs fusing with the web as indicated at 21 in Fig. 2.

The particular pans illustrated in Figs. 1 and 2 are what would be called cake bake pans. Many of these are round although other shapes are employed. Other types of pans such as bread bake pans may also be secured to the strapping by the cantilever plate 14. The cantilever may also be applied to bake pans which are provided with wire reinforced lips.

In Fig. 5 is illustrated a bake pan 23 having curled lip 24 at the top thereof having within the lip a reinforcing wire 25. As shown, plate 14 is so positioned that the fingers can be driven between the reinforcing wire 25 and the inside surface of the pan lip thus causing them to curl about the same within the lip 24. When so secured to the lip of the pan, the plate may be welded to the web of the strapping 11 in the same manner as described in connection with the bake pan unit of Figs. 1 and 2.

The means illustrated of securing the bake pans to the strapping thereof has many advantages, among which are:

The individual pans are resiliently connected by a cantilever plate 14 and its fingers 15 to the strapping whereby plate 14 may yield at its fixed end when unequal expansion and contraction occurs in the pans and strapping thereby relieving the side walls of the pans of mechanical strain. The use of rivets for the purpose of securing the side walls of the pans to the strapping is eliminated thereby avoiding or eliminating the hazard of rivet heads breaking off and being trapped in the baked product; and the inside surfaces of the pans are rendered smooth there being no rivets or projections extending into the same thereby rendering the pans more sanitary in that there are no crevices in or on the pan baking surfaces in which foreign matter may accumulate.

Having thus described the invention, it will be apparent to those skilled in this art, that various modifications and changes may be made in the illustrated embodiment without departing from either the spirit or scope of the invention.

Therefore, what is claimed as new and desired to be secured by Letters Patent is:

1. A cake pan assembly comprising a group of circular pans, each pan having a hollow beaded lip, a band embracing the group of pans, a separate plate between the band and each pan at a location where the band and pans are approximately tangent to each other, each plate having at the upper edge thereof at least one finger provided with an eye at the end thereof disposed within the bead of its associated pan, said plate being joined to the band at at least one point by fused metal, the portion of each plate below said bead being spaced from the adjacent pan wall.

2. A device for securing a hollow beaded bake pan to a strapping band comprising a plate having at one edge thereof a finger that is narrower than the plate and tapers in thickness from the edge of the plate to its tip, said finger being adapted when driven into the inside of the bead to curl and form an eye therein that is nested within the bead, said plate having an outwardly extending projection adapted to be fused to the strapping band.

3. A device according to claim 2 in which there are a plurality of spaced tapered fingers and that the plate is shaped to conform to the contour of the body of a bake pan.

4. A bake pan unit comprising a frame formed of strap metal, a group of spaced circular pans disposed within the frame, each pan having a hollow beaded rim and means for flexibly securing the pans to the frame at locations where the strap metal is approximately tangent thereto, said means comprising a plate for each pan located between the pan and the strap metal at the location of approximate tangency, said plate having at its upper edge at least one finger provided with an eye at the end thereof and disposed within the hollow bead of the pan and having a tight friction fit therewith, the body of the plate below said eye being joined by fused metal to the adjacent strap of the frame and spaced from the adjacent pan wall.

5. A bake pan unit comprising a frame formed of strap metal, a group of spaced circular pans disposed within the frame, each pan having a hollow beaded rim and means for flexibly securing the pans to the frame at locations where the strap metal is approximately tangent thereto, said means comprising a plate for each pan located between the pan and the strap metal at the location of approximate tangency, said plate having at its upper edge at least one finger provided with an eye at the end thereof and disposed within the hollow bead of the pan and having a tight friction fit therewith, and means for securing the body of the plate to the adjacent strap of the frame in spaced relation to the adjacent pan wall.

References Cited in the file of this patent
UNITED STATES PATENTS

| | | |
|---|---|---|
| 1,302,663 | Jackson | May 6, 1919 |
| 1,302,664 | Jackson | May 6, 1919 |
| 1,823,068 | Stollberg | Sept. 15, 1931 |
| 2,260,782 | Langel | Oct. 28, 1941 |

FOREIGN PATENTS

| | | |
|---|---|---|
| 375,221 | Great Britain | June 23, 1932 |
| 548,779 | Great Britain | Oct. 23, 1942 |